United States Patent [19]

Cowan et al.

[11] Patent Number: 5,314,022
[45] Date of Patent: May 24, 1994

[54] DILUTION OF DRILLING FLUID IN FORMING CEMENT SLURRIES

[75] Inventors: Kenneth M. Cowan, Sugar Land; Arthur H. Hale; James J. W. Nahm, both of Houston, all of Tex.

[73] Assignee: Shell Oil Company, Houston, Tex.

[21] Appl. No.: 965,142

[22] Filed: Oct. 22, 1992

[51] Int. Cl.$^5$ .................... E21B 33/14; C09K 7/02
[52] U.S. Cl. .................... 166/293; 166/292; 166/295; 175/66; 507/140
[58] Field of Search .................... 175/61, 62, 64, 65, 175/66; 166/291, 292, 293, 294, 295; 507/140

[56] References Cited

U.S. PATENT DOCUMENTS

| | | |
|---|---|---|
| 2,366,723 | 12/1943 | Drummond . |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,526,280 | 9/1970 | Aulick ..................... 166/285 |
| 3,557,876 | 1/1971 | Tragesser . |
| 3,670,832 | 6/1972 | Striegler . |
| 3,675,728 | 7/1972 | Faulk et al. . |
| 3,695,355 | 10/1972 | Wood et al. ..................... 166/295 |
| 3,712,393 | 1/1973 | Shedahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,312,405 | 1/1982 | Wilder ..................... 166/285 |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. . |
| 4,460,292 | 7/1984 | Durham et al. . |
| 4,518,508 | 5/1985 | Conner ..................... 210/751 |
| 4,643,617 | 2/1987 | Kanno et al. ..................... 405/222 |
| 4,664,843 | 5/1987 | Burba, III et al. . |
| 4,668,128 | 5/1987 | Hartley et al. . |
| 4,674,574 | 6/1987 | Savoly et al. ..................... 166/293 |
| 4,690,589 | 9/1987 | Owa ..................... 405/263 |
| 4,692,065 | 9/1987 | Suzuki et al. ..................... 405/211 |
| 4,720,214 | 1/1988 | Brasted et al. . |
| 4,746,245 | 5/1988 | Mork ..................... 405/224 |
| 4,760,882 | 8/1988 | Novak . |
| 4,761,183 | 8/1988 | Clarke . |
| 4,790,954 | 12/1988 | Burba, III et al. . |
| 4,880,468 | 11/1989 | Bowlin et al. . |

(List continued on next page.)

FOREIGN PATENT DOCUMENTS

| | | |
|---|---|---|
| 85-144069 | 7/1983 | Japan . |
| 61-48454 | 3/1986 | Japan . |
| 833704 | 6/1981 | U.S.S.R. . |

Primary Examiner—George A. Suchfield

[57] ABSTRACT

A drilling fluid is diluted and a cementitious component added thereto. In a more specific embodiment the dilution is carried out by introducing liquid such as water to a flowing stream of the drilling fluid and thereafter a cementitious component is mixed therewith. Thus, the drilling fluid can be used in a conventional manner to drill a well and thereafter diluted and a cementitious component added to produce a cement for cementing operations such as setting a casing in the well and/or can be used for remedial cementing.

In another embodiment of the invention, the drilling fluid itself contains a small amount of cementitious component and additional cementitious component is added after the dilution.

30 Claims, 1 Drawing Sheet

U.S. PATENT DOCUMENTS

| | | | |
|---|---|---|---|
| 4,883,125 | 11/1989 | Wilson et al. | 166/293 X |
| 4,897,119 | 1/1990 | Clarke . | |
| 4,913,585 | 4/1990 | Thompson et al. . | |
| 4,942,929 | 7/1990 | Malachosky et al. . | |
| 4,991,668 | 2/1991 | Rehm et al. . | |
| 5,016,711 | 5/1991 | Cowan . | |
| 5,020,598 | 6/1991 | Cowan et al. | 166/293 |
| 5,026,215 | 6/1991 | Clarke . | |
| 5,058,679 | 10/1991 | Hale et al. . | |
| 5,082,499 | 1/1992 | Shen | 106/735 |
| 5,086,850 | 2/1992 | Harris et al. . | |
| 5,105,885 | 4/1992 | Bray et al. . | |
| 5,106,423 | 4/1992 | Clarke . | |
| 5,121,795 | 6/1992 | Ewert et al. . | |
| 5,123,487 | 6/1992 | Harris et al. . | |
| 5,125,455 | 6/1992 | Harris et al. . | |
| 5,127,473 | 7/1992 | Harris et al. . | |
| 5,133,806 | 7/1992 | Sakamoto et al. | 106/811 |
| 5,147,565 | 9/1992 | Bour et al. | 252/8.551 |
| 5,213,160 | 5/1993 | Nahm et al. | 166/292 X |

OTHER PUBLICATIONS

"Deep Cement Mixing Experience in Japan", by G. Dennis et al, Copyright 1985 Seabed Strengthening Symposium, Denver, Colo., Jun. 4, 1985, TP 85–5.

"Mud Disposal: An Industry Perspective", Hanson et al, Drilling, May 1986, pp. 16–21.

"Waste Minimization Program Can Reduce Drilling Costs", Hall et al, Oryx Energy Co., Houston, Tex., Oil & Gas Journal, Jul. 1, 1991, pp. 43–46.

"Phosphoric Acids and Phosphates", Kirk–Othmer Enc. of Chemical Technology, 3rd Ed., vol. 17, p. 477.

"Coversion of Drilling Fluids to Cements with Blast Furnace Slag—Performance Properties and Applications for Well Cementing", SPE Paper 24575 (Oct. 4, 1992) by Cowan et al.

"Quantitative Interpretation of X-Ray Diffraction Patterns of Mixtures. I. Matrix–Flushing Method for Quantitative Multicomponent Analysis" by Frank H. Chung, J. Appl. Cryst. (1974) 7, pp. 519–525.

DILUTION OF DRILLING FLUID IN FORMING CEMENT SLURRIES

BACKGROUND OF THE INVENTION

This invention relates to forming cementitious slurries from drilling fluids and to using such slurries in drilling and cementing.

Cementing of the annulus between an oil well casing and the surrounding borehole has been practiced for over 90 years. Long ago, it was recognized that it would be advantageous to solidify drilling fluid in the annulus so as to reduce the cost of the cementing of the casings. Over the decades, various attempts have been made along this line as evidenced by the disclosures in Williams et al., U.S. Pat. No. 2,649,160 (Aug. 18, 1953), Tragesser, U.S. Pat. No. 3,557,876 (Jan. 26, 1971), and Miller et al., U.S. Pat. No. 3,887,009 (Jun. 3, 1975). However, such techniques, while presumably operable, have failed to achieve commercialization even after the passage of many years. Another attempt in this direction is described in Wyant et al., U.S. Pat. No. 3,499,491 (Mar. 10, 1970), wherein Portland cement is used in an aqueous drilling fluid to produce a mud concrete. Portland cement, however, is very sensitive to the water/solids ratio. Even under ideal conditions, only small increases in the amount of solids results in a very viscous mass. On the other hand, and only a slight decrease in the amount of solids results in a composition which sets up to give a very weak structure. These problems are amplified when attempting to use Portland cement in a drilling mud. Thus, while this technique has been used commercially, it has serious drawbacks.

Expanded use of extended reach drilling and slim hole drilling has increased the problem of removing an incompatible drilling fluid before cementing, because the more narrow annulus created in these techniques create makes conventional cementing far more difficult.

Generally, drilling fluids are tailored to the characteristics of the formation into which the borehole is being drilled so far as density and rheological properties such as viscosity are concerned. Thus, even if the composition is tolerant of substantial variations in solids to liquid ratio so far as strength and viscosity are concerned, the density is still changed by the addition of a cementitious material to the composition.

Finally, when the drilling operation is complete there remains the problem of disposing of the used drilling fluid.

SUMMARY OF THE INVENTION

It is an object of this invention to provide an improved method for producing a cement slurry.

It is a further object of this invention to reduce the amount of equipment required for cementing operations in a wellbore.

It is yet a further object of this invention to reduce the time required for cementing operations in a wellbore.

It is yet a further object of this invention to improve the tailoring of cement slurry densities for a given formation.

It is still yet a further object of this invention to provide a process suitable for cementing in a restricted annulus.

It is still yet a further object of this invention to avoid the necessity for disposing of used drilling fluid.

In accordance with this invention, a drilling fluid is utilized in a wellboring operation and thereafter a portion thereof is diluted and a cementitious material is added to give a cementitious slurry.

In accordance with a more specific aspect of this invention, a diluent is added to a flowing stream of drilling fluid and a cementitious material is also combined with the drilling fluid to produce a cementitious slurry.

In accordance with yet another embodiment of this invention a drilling fluid having a small amount of a cementitious material (universal fluid) is utilized in a drilling operation and thereafter diluted and additional cementitious material and an activator are added.

Thus, in accordance with this invention, a significant improvement in the operating procedure is provided. This is because the density of the drilling fluid is frequently tailored to the characteristics of the formation through which the wellbore is being drilled. Thus, the density is chosen in the first place to be sufficient to avoid inflow into the wellbore because of formation pressure but is further chosen to be insufficient to rupture the borehole wall and force the fluid out into the formation. By utilizing the dilution and thereafter addition of the cementitious component (or in the case of universal fluid (UF), the remainder of the cementitious component) the cement can likewise have a density tailored to the particular operation. In addition, this avoids undue thickening of the drilling fluid as would occur, particularly with some hydraulic components, without the dilution and thus the rheological properties of the cement and the drilling fluid can both be tailored for optimum performance.

BRIEF DESCRIPTION OF THE DRAWINGS

In the drawings, forming a part hereof, wherein like reference characters denote like parts in the various views.

DETAILED DESCRIPTION OF THE INVENTION

In this description the term 'cementitious material' means either an hydraulic material which on contact with water and/or activators hardens or sets into a solidified composition or a component which, on contact with a reactive second component, sets or hardens into a solidified composition. Thus, broadly it can be viewed as a material which can chemically combine to form a cement. A slurry of the cementitious material and the component or components which cause it to harden is referred to herein as a cementitious slurry. The term 'pipe' means a casing or liner.

Drilling Fluids

The initial drilling fluid or mud can be either a conventional drilling fluid, i.e., one not containing a cementitious material, or it can be one already containing a cementitious material in a relatively small amount (universal fluid). The drilling fluid can be either a water-based fluid or an oil-based fluid. The term 'water-based fluid' is intended to encompass both fresh water muds, salt water containing muds, whether made from seawater or brine, and other muds having water as the continuous phase including oil-in-water emulsions. In any event drilling fluid will always contain at least one additive such as viscosifiers, thinners, clay and/or additives for fluid loss control and filter cake quality, dissolved salts, solids from the drilled formations, solid weighting agents to increase the fluid density, formation stabilizers to inhibit deleterious interaction between the drilling fluid and geologic formations, and additives to improve the lubricity of the drilling fluid.

It is generally preferred that the water-based drilling fluids use water containing dissolved salts, particularly sodium chloride. In these instances, 0.1 to 26, preferably 3 to 10 wt % sodium chloride may be used. In some instances, a saturated salt solution under the conditions being employed can be used. One suitable source is to use seawater or a brine solution simulating seawater. Particularly in the embodiment using slag, the strength of the resulting cement is actually enhanced which is contrary to what would be expected in view of the intolerance of Portland cement to brine. Various salts, preferably organic salts, are suitable for use in the drilling fluid used in this invention in addition to, or instead of NaCl, including, but not limited to, NaBr, KCl, $CaCl_2$, $NaNO_3$, $NaC_2H_3O_2$, $KC_2H_4O_2$, $NaCHO_2$ and $KCHO_2$ among which sodium chloride is preferred, as noted above. The term 'oil-based fluids' is meant to cover fluids having oil as the continuous phase, including zero to low water content oil-base mud and invert oil-emulsion mud.

A typical mud formulation to which cementitious material may be added to form drilling fluid is as follows 10-20 wt % salt, 8-10 lbs/bbl bentonite, 4-6 lbs/bbl carboxymethylated starch (fluid loss preventor), sold under the trade name "BIOLOSE" by Milpark, 0.5-1 lbs/bbl partially hydrolyzed polyacrylamide (PHPA) which is a shale stabilizer, sold under the trade name "NEWDRIL" by Milpark, 1-1.25 lbs/bbl carboxy methyl cellulose (CMC) sold under the trade name "MILPAC" by Milpark, 30-70 lbs/bbl drill solids, and 0-500 lbs/bbl barite.

The term 'universal fluid' is used herein to designate those compositions containing cementitious material, which compositions are suitable for use as a drilling fluid, and which compositions thereafter, for the purpose of practicing this invention, have additional cementitious material and/or activators such as accelerators (or reactive second components) added to give a cementitious slurry.

Thus, with the universal fluid embodiment of this invention, the purpose of one aspect of the invention is achieved through a method for drilling and cementing a well comprising preparing a universal fluid by mixing a drilling fluid and a cementitious material; drilling a borehole with the universal fluid and laying down a settable filter cake on the walls of the borehole during drilling of the well; diluting the drilling fluid; adding additional cementitious material and/or accelerators (or reactive second components) and introducing the thus-formed cementitious slurry into the wellbore and into an annulus between the wellbore and a casing where it hardens and sets up forming a good bond with the filter cake which filter cake, with time, actually hardens itself because of the presence of cementitious material therein. This hardening is facilitated by any accelerators which may be present in the cementitious slurry and which migrate by diffusion and/or filtration into the filter cake.

Non-Conventional Cements

The cementitious component can be any one or more of: conventional hydraulic cement, natural or artificial pozzolan, or the metal compound used to produce an ionomer or to produce a phosphorus salt. The preferred cementitious material is one selected from the group consisting of blast furnace slag, a metal compound which is a proton acceptor component used to produce the ionomer and a metal compound which is a proton acceptor component used to produce the phosphorus salt. By 'blast furnace slag' is meant the hydraulic refuse from the melting of metals or reduction of ores in a furnace as disclosed in Hale and Cowan, U.S. Pat. No. 5,058,679 (Oct. 22, 1991), the disclosure of which is hereby incorporated by reference. By 'phosphorus salt' is meant a phosphonate, a phosphate or a polyphosphate as is described in detail hereinafter.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Maryland.

A usual blast furnace slag composition range in weight percent is: $SiO_2$, 30-40; $Al_2O_3$, 8-18; CaO, 35-50; MgO, 0-15; iron oxides, 0-1; S, 0-2 and manganese oxides, 0-2. A typical specific example is: $SiO_2$, 36.4; $Al_2O_3$, 16.0; CaO, 43.3; MgO, 3.5; iron oxides, 0.3; S, 0.5; and $MnO_2O_3 < 0.1$.

Blast furnace slag having relatively small particle size is frequently desirable because of the greater strength it imparts in many instances to a final cement. Characterized in terms of particle size the term "fine" can be used to describe particles in the range of 4,000 to 7,000 $cm^2/g$ Blaine specific surface area. Corresponding to 16 to 31 microns in size; "microfine" can be used to describe those particles in the 7,000 to 10,000 $cm^2/g$ Blaine specific surface area range that correspond to particles of 5.5-16 microns in size and "ultrafine" can be used to describe particles over 10,000 $cm^2/g$ Blaine specific surface area that correspond to particles 5.5 microns and smaller in size. Small particle size blast furnace slag is available from Geochem under the trade name "MICROFINE MC 100", the Blue Circle Cement Company, and Koch Minerals, Wichita, Kansas, under the trade name "WELL-CEM". The Koch material has a Blaine specific surface area of about 10,040 $cm^2/g$.

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4wt % of the slag, would need to be ground to the ultrafine particle size. Generally, 5 to 20wt %, more preferably 5 to 8wt % can be ground to the ultrafine particle size and the remainder ground in a normal way thus giving particles generally in a size range of greater than 11 microns, the majority being in the 11 to 31 micron range.

By ionomer is meant organometal compositions having a metal attached to or interlocking (crosslinking) a polymer chain. Suitable polymer components of such ionomers can be represented by the formula $$-(CH_2-CH_2)_m-(CH_2-C)_n-$$
$$\quad\quad\quad\quad\quad\quad\quad\quad |$$
$$\quad\quad\quad\quad\quad\quad\quad\quad R$$
$$\quad\quad\quad\quad\quad\quad\quad\quad |$$
$$\quad\quad\quad\quad\quad\quad\quad\quad A$$

wherein A is or a mixture of and wherein R is H or a 1-10 carbon atom alkyl radical. The ratio of m to n is generally within the range of 0:1 to 100:1, preferably 0.1:1 to 10:1.

The polymer generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One such polymer is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000–15,000,000 molecular weight are suitable. The copolymers will generally have from 2-99, preferably 5-80, more preferably 10-60 mole percent acid-containing units.

The poly(carboxylic acid) component can be any water soluble or water dispersable carboxylic acid polymer which will form ionomers. Ionomer forming polymers are well known in the art. Suitable polymers include poly(acrylic acid) poly(methacrylic acid), poly(ethacrylic acid), poly(fumaric acid), poly(maleic acid), poly(itaconic acid) and copolymers such as ethylene/acrylic acid copolymer and ethylene/methacrylic acid copolymer. The copolymers are generally random copolymers. An example of phosphonic acid polymers is poly(vinyl phosphonic acid) which is made from vinyl phosphonic acid, Suitable copolymers containing vinyl phosphonic acid include vinyl phosphonic acid/acrylic acid copolymer as well as copolymers with other unsaturated monomers, with or without a functional group.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature in the static temperature of the surrounding formations.

One way to slow down the formation of the ionomer on contact with the metal source is to utilize a polymer with ester linkages which will hydrolyze with time in the aqueous cementitious slurry to give more reactive sites. Up to 100% of the functional groups can be ester groups depending on the degree to which it is desired to inhibit the setting.

The ionomers suitable for use in this invention are the water-insoluble reaction product of a proton acceptor metal compound which serves as the cementitious component and a carboxylic, sulfonic, or phosphonic acid polymer component. The metal compound generally is a metal oxide such as CaO, MgO or ZnO. The preferred metal oxides are magnesium oxide and zinc oxide, and most preferably, magnesium oxide. The applicable metal oxides are generally fired at temperatures above 1,000° F. for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity of at least 3.0, preferably 3.5. By 'insoluble' is meant that less than 0.01 parts by weight dissolve in 100 parts by weight of cold (room temperature) water.

The particle size of the metal compound component can vary widely. Generally, it will be within the range such that the powder exhibits a Blaine specific surface area within the range of 1,500 cm$^2$/g to 30,000 cm$^2$/g, preferably 1,500 cm$^2$/g to 25,000 cm$^2$/g, most preferably 2,000 cm$^2$/g to 20,000 cm$^2$/g.

The amount of polymer utilized will vary widely depending upon the carboxylic acid content of the polymer; broadly, 10 to 200, preferably 10 to 100, most preferably 10 to 80wt %, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred.

Phosphates and phosphonates, referred to herein as phosphorus salts, used in accordance with this invention also are produced from a two-component composition, the first component of which is a metal compound identical in scope to that used in the ionomers as described hereinabove so long as the resulting phosphorus salt is insoluble in water. Most preferred are CaO, MgO and ZnO.

The second component is a phosphonic or phosphoric acid, preferably a polyphosphoric acid. The term 'phosphoric acid' is meant to encompass both linear and cyclic polyphosphoric acids. These second component acids are referred to herein as phosphorus acids. Linear phosphoric acids can be depicted by the general formula $H_{n+2}P_nO_{3n+1}$ where n is 1 to 100, preferably 2 to 50, more preferably, 2 to 20. Examples include di-(pyro)phosphoric acid, tri (tripoly)phosphoric acid, tetra-phosphoric acid and higher molecular weight polyphosphoric acids as well as phosphoric acid. Mixtures of acids, including those traditionally referred to as meta phosphoric acid, are particularly suitable for use in this invention.

The formation of one phosphate cement using a metal oxide as the metal compound can be depicted as follows:

where:
X is usually 4; and
MO = metal oxide which is amphoteric or is a proton acceptor.

The phosphorus acid component is used in a stoichiometric amount or less since an excess of acid should generally be avoided. From 1 to 10 or even 1 to 50 mole percent less than a stoichiometric amount is suitable. Generally, a stoichiometric amount will be between 10 and 100 wt % based on the weight of the metal compound.

Suitable retarders for the setting of the phosphate cement include boric acid and borate salts and aluminates such as sodium aluminate. These can be used in an amount within the range of 1 to 100% by weight based on the weight of the phosphorus acid.

With the ionomers, and the phosphorus salts when made with a polyvalent metal compound, a crosslinked network structure exists as a result of the addition of the second component, thus giving a very strong solid cement.

Because of the mass provided by the metal compound component of the ionomer or the polyphosphorus salt, these cementitious materials are generally actually heavier than most slag or Portland cement materials. In the embodiments using these cementitious materials this high density provides significant advantages in certain utilities. For one thing, a smaller amount of the material can be used and still achieve a final mud and ultimately cement of a desired density. Secondly, because of the high density, it is possible to operate without weighting agents such as hematite or barium sulfate (barite). They offer a further advantage in that they do not set up until the second component is added.

The metal compound of the ionomer or phosphorus salt can be used as the sole cementitious material or can be used in admixture with siliceous hydraulic materials such as the blast furnace slag or Portland cement. In one embodiment an hydraulic component such as slag can be used to give the metal ion component of the ionomer or phosphate to give, in effect, a mixture formed in situ.

Preferably, when the ionomer or phosphorus salt is utilized, the metal compound is added first and thereafter at such time as it is desired for the cement to be activated to set, the other component is added. In the case of the universal fluids, a portion of the total metal compound can be added to the drilling fluid, the remainder being added after dilution when the cementitious slurry is being formed.

The sequence for the universal fluid embodiment of this invention is to prepare the drilling fluid containing a portion of the total slag or metal compound to be utilized, carry out the drilling operation, dilute the fluid, add the remainder of the slag or metal compound, and thereafter add the activator or acid components and utilize the cement for its intended purpose such as cementing a casing.

In accordance with the invention that utilizes universal fluid, the fluid itself becomes a part of the final cement and thus, this portion of the drilling fluid does not need to be disposed of.

In all embodiments of the invention, additional cement can be made and used, in accordance with this invention, for remedial cementing.

The ionomer embodiments of this invention are of particular value for filling and sealing the annulus between a borehole wall and a casing, or between casings, particularly where some degree of ductility and/or tensile strength is desired. The ionomer has good adhesive properties to the borehole wall and casing and has greater elasticity than is obtained with siliceous hydraulic materials such as Portland cement. Thus, such cements are resistant to cracking under conditions of cyclic loading as are frequently encountered in a wellbore. For similar reasons the ionomer embodiment of the invention is beneficial in cementing liners and tieback casing strings which may otherwise leak due to changes in pressure and temperature in the well during production operations. Another area where the ductility of the ionomer cement is of special value is in slim hole wells where the annulus is smaller. Still yet another area where this ductility is important is in extended reach drilling. The term 'extended reach' is intended to cover horizontal drilling and any other well drilling operations which are off-vertical a sufficient amount to cause the casing to be displaced by gravity toward one side of the borehole.

As noted hereinabove the initial drilling fluid can be either a conventional drilling fluid or it can be a universal fluid which already has cementitious material therein.

Dilution

In all embodiments, the amount of dilution can vary widely depending on the desired application. Generally, the fluid will be diluted with from 5 to 200 by volume, preferably 5 to 100% by volume, more preferably 5 to 50% by volume of liquid (water in the case of a water-based fluid) based on the volume of initial drilling fluid. In one particularly preferred embodiment, the dilution is such that on addition of the cementitious component (or in the case of the universal fluid addition of the remaining cementitious component) the final density will be within the range of 30% less to 70% more than the original density, preferably within the range of 15% less to 50% more, most preferably, essentially the same, i.e., varying by no more than ±5 wt %. This is particularly valuable in an operation where there is a narrow pressure window between the pressure needed to prevent blowout and the pressure which would rupture or fracture the formation through which drilling has taken place.

The dilution fluid can be the same or different from that used to make the drilling fluid in the first place. In the case of brine-containing fluids the dilution fluid will generally be brine also. This is of particular benefit in offshore drilling operations where fresh water is not readily available but brine is since seawater is a desirable brine.

Thus, as noted above, a significant improvement in the operating procedure is provided in accordance with this invention. This is because the density of the drilling fluid is frequently tailored to the characteristics of the formation through which the wellbore is being drilled. Thus, the density is chosen in the first place to be sufficient to avoid inflow into the wellbore because of formation pressure but is further chosen to be insufficient to rupture or fracture the borehole wall and force the fluid out into the formation. By utilizing the dilution and thereafter addition of the cementitious component (or in the case of universal fluid, the remainder of the cementitious component) the cementitious slurry can likewise have a density tailored to the particular operation. In addition, this avoids undue thickening of the drilling fluid as would occur, particularly with some hydraulic components, without the dilution and thus the rheological properties of the cementitious slurry and the drilling fluid can both be tailored for optimum performance.

The invention (dilution of a drilling fluid and thereafter adding cementitious material to produce a cementitious slurry) offers special advantages with certain cementitious components in addition to the general benefits such as reduced equipment needs. With Portland cement it reduces the extraordinary viscosity increase that adding such an hydraulic material to a drilling fluid would give. With slag, organometals and polyphosphates there is the advantage that the cementitious component has a drilling fluid function. With the ionomers and polyphosphates there is the further general advantage that unlimited time can elapse between the drilling and cementing operations with no loss of properties of either because these materials do not begin to set until the second component is added.

Figure 1:
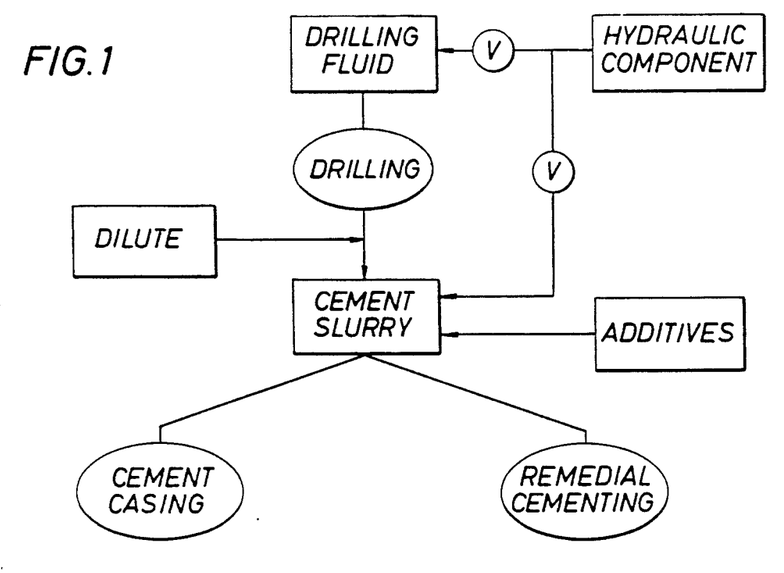
FIG. 1 is a conceptual process flow diagram of various embodiments of the invention.
Figure 2:
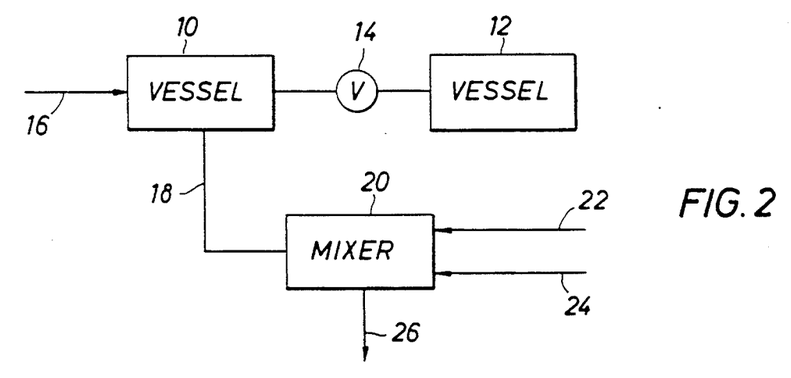
FIG. 2 is a flow diagram depicting one method of diluting and adding cementitious material.

The dilution can be carried out in either of two ways. First, a vessel containing drilling fluid can simply be isolated and the desired amount of water or other diluent added thereto. One example of this is shown in FIG. 2 where first vessel 10 is isolated from second vessel 12 by means of valve 14 and dilution fluid added via conduit 16. Vessels 10 and 12 can be tanks, ponds, earth pits, or any other means suitable for containing drilling fluid. Drilling fluid in vessel 10 is then conveyed by a line 18 to mixer 20 where it is mixed with cementitious material added via conduit 22 and other additives which are introduced via conduit 24. The resulting cementitious slurry is then withdrawn via line 26 for use in cementing operations.

Figure 3:
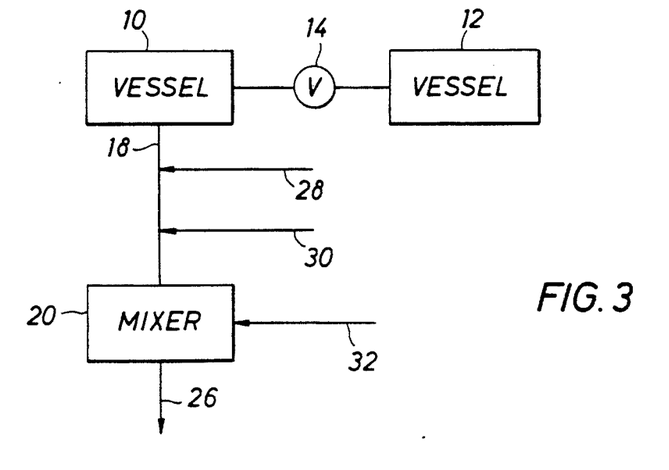
FIG. 3 is a flow diagram of a preferred method of diluting and adding cementitious material.

In FIG. 3 there is shown a preferred dilution apparatus and process wherein valve 14 does not have to be closed off and drilling fluid from vessel 10 is withdrawn via line 18 and passed to mixer 20. Dilution fluid is then added "on the fly" preferably by means of first side conduit 28 through which the dilution fluid may be continuously added, and other additives are then introduced via second side conduit 30, if desired. The cementitious material can be added via conduit 32. The resulting cement is then withdrawn via line 26 as in the embodiment shown in FIG. 2. If desired, additional additives can be added via line 32 directly into the mixer. Also, if desired, the cementitious material can be added with the diluent by first side conduit 28. The functions of conduit 32 and second side conduits 28 or 30 can be reversed with the cementitious material being added via side conduits 28 or 30 and the additives via line 32. Alternatively, all ingredients can be added via first side conduit 28. Addition of the diluent before or during the addition of the cementitious material (or additional cementitious material in the case of a universal fluid) is thus achieved. In either case the cementitious material added to produce the cement is added to a diluted drilling fluid and preferably, all the diluent is added before any of the cementitious material is added to the used drilling fluid.

In accordance with this invention as depicted by either FIG. 2 or FIG. 3, there is reduced equipment required to produce the cement since all pumping can be done with pumps already being used for the mud. If desired, a separate unit normally employed for cement mixing and pumping can thus be eliminated. The procedure shown in FIG. 3 where the dilution is done "on the fly" further reduces equipment and time and allows improved tailoring of the cement to the formation without compromising the tailoring of the initial drilling fluids to the formation.

Mixing "on the fly" avoids having to isolate the mud. This reduces variable platform or drilling ship deck loadings on offshore operations since less equipment and hence less weight is required. Also, high mixing energy is not required for good slurry properties where the diluent is added first. Therefore, as noted above, it is possible to mix with pumps normally utilized with the rig equipment.

In one embodiment the drilling fluid consists essentially of slag and seawater and is pumped exclusively using the piping and pumps associated with the drilling rig without the need for any pumps designed for pumping cement.

Reference herein to additives encompasses both the specialized additives necessary for this invention such as the carboxylic acid polymer in the case of the ionomer or the polyphosphoric acid in the case of the polyphosphate as well as conventional additives.

Additives

Conventional additives which can be added include accelerators, retarders, thinners and other known components of cementitious materials.

Mixed metal hydroxides can be used in the drilling fluid to impart thixotropic properties. The mixed metal hydroxides provide better solids suspension. This, in combination with the settable filter cake provided in the technique of this invention, greatly enhances the cementing in a restricted annulus. The mixed metal hydroxides are particularly effective in muds containing clay such as sodium bentonite. Preferred systems thickened in this way contain from 1-20 lbs/bbl of clay such as bentonite, preferably 2 to 15 lbs/bbl, most preferably 7 to 12 lbs/bbl. The mixed metal hydroxides are generally present in an amount within the range of 0.1 to 2 lbs/bbl of total drilling fluid, preferably 0.1 to 0.5 lbs/bbl, most preferably 0.7 to 1.2 lbs/bbl. Mixed metal hydroxides are known in the art and are trivalent metal hydroxide containing compositions such as MgAl(OH)$_{4.7}$Cl$_{0.3}$. They conform essentially to the formula $$Li_m D_d T(OH)_{(m+2d+3+na)} A'_a{}^n$$

where
M represents the number of Li ions present; the said amount being in the range of zero to about 1;
D represents divalent metals ions; with
d representing the amount of D ions in the range of zero to about 4;
T represents trivalent metal ions;
A' represents monovalent or polyvalent anions of valence -n, other than OH$^-$, with a being the amount of A' anions; and where (m+2d+3+na) is equal to or greater than 3.

A more detailed description can be found in Burba, U.S. Pat. No. 4,664,843 (May 12, 1987).

The mixed metal hydroxides in the drilling fluid, in combination with blast furnace slag, tend to set to a cement having considerable strength in a comparatively short time, i.e., about one-half hour at temperatures as low as 100° F. This can be a major asset in some applications. In such instances, a thinner such as a lignosulfate is preferably added before adding slag. However, one of the advantages of this invention is that it reduces or eliminates the need for additives to control free water or solids suspension. The activator or activators can be added either with any other ingredients that are added before the additional blast furnace slag, with the additional blast furnace slag, or after the addition of the additional blast furnace slag.

In some instances, it may be desirable to use a material which functions as a retarder along with the activator because of the need for other effects brought about by the retarder. For instance, a chromium lignosulfonate may be used as a thinner along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, a phenol sulfonate, a naphthalene sulfonate, dodecylbenzene sulfonate, and mixtures thereof.

Other additives which can be present in the drilling fluid include low and medium yield clays, carboxymethyl cellulose, polyacrylonitrile, natural gum, molecularly dehydrated phosphate, tannin compounds, quebracho, mined lignites, lignosulfonates broadly, mica, sugar cane fibers and granular materials. In addition to bentonite, amorphous and crystalline clays such as kaolinite, halloysite, smectite, montmorillonite, illite, saconite, vermiculite, chlorite, attapulgite, sepiolite, palygorskite and Fuller's earth are useful in combination with mixed metal hydroxides.

It is particularly desirable in accordance with a further embodiment of this invention to utilize silica to increase the temperature resistance of the final cement. The use of blast furnace slag as the hydraulic component, in itself, allows greater latitude in the temperature which can be tolerated, because the blast furnace slag is inherently less thermally sensitive than other known hydraulic components such as Portland cement and thus can be hardened over a wider range of temperatures without resort to additives. This is of particular advantage where there is a substantial temperature gradient from the top to the bottom of a borehole section to be cemented. However, with the addition of silica, further temperature resistance may be imparted to the cement after it is set. Thus, with blast furnace slag and silica a temperature resistant cement is possible and with other cementitious components the temperature range can be extended through the used silica. Suitable silicas include crystalline silicas such as alpha quartz.

Universal Fluids

In another embodiment of this invention, most or all of the components of the drilling fluid are chosen such that they have a function in the cementitious material also. The following Tables illustrate the uniqueness of such formulations.

TABLE A

| | Function | | | |
|---|---|---|---|---|
| | Drilling Fluid | | Cementitious Slurry | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Biopolymer[3] | Viscosity | | Viscosity | Retarder |
| Silicate | Viscosity | Shale stabilizer | Accelerator | — |

TABLE A-continued

| | Function | | | |
|---|---|---|---|---|
| | Drilling Fluid | | Cementitious Slurry | |
| Additive | Primary | Secondary | Primary | Secondary |
| Carbohydrate polymer[4] | Deflocculant | — | Retarder | Deflocculant |
| Barite[5] | Density | — | Density | Solids |
| Bentonite[5] | Fluid loss control | — | Fluid loss control | Solids |
| Clay/Quartz dust[7] | — | — | Solids | — |
| Slag[8] | Cuttings stabilizer | — | Cementitious | Solids |
| Lime[9] | Cuttings/Wellbore stabilizer | Alkalinity | Accelerator | Solids |
| PECP[10] | Shale stabilizer | Fluid loss | Retarder | Rheological control |
| NaCl | Shale stabilizer | — | — | — |

[1]Polydrill, A synthetic polymer manufactured by SKW Chemicals Inc. under trade name Polydrill, for instance
[2]Starch made by Milpark Inc. under the trade name "PERMALOSE", for instance.
[3]A biopolymer made by Kelco Oil Field Group, Inc., under the trade name "BIOZAN" for instance.
[4]Water-soluble carbohydrate polymer manufactured by Grain Processing Co. under the trade name "MOR-REX".
[5]Barite is $BaSO_4$, a drilling fluid weighting agent.
[6]Bentonite is clay or colloidal caly thickening agent.
[7]Clay/quartz solid dust manufactured by MilWhite Corp. under the trade name "REVDUST", for instance.
[8]Blast furnace slag manufactured by Blue Circle Cement Co. under the trade name "NEWCEM" is suitable.
[9]CaO
[10]Polycyclicpolyetherpolyol

TABLE B

| | Function | | | |
|---|---|---|---|---|
| | Drilling Fluid | | Cementitious Slurry | |
| Additive | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Biopolymer[3] | Viscosity | . | Viscosity | Retarder |
| Silicate | Viscosity | Shale stabilizer | Accelerator | — |
| Carbohydrate polymer[4] | Deflocculant | — | Deflocculant | Deflocculant |
| Barite[5] | Density | — | Density | Solids |
| Bentonite[5] | Fluid loss control | — | Fluid loss control | Solids |
| Clay/Quartz dust[7] | — | — | Solids | — |
| Metal Compound[8] | Weight | Solids | Cementitious component | Solids |
| Functional Group Polymer | Not present | Not present | Cementitious Component | — |
| Lime[9] | Cuttings/Wellbore stabilizer | Alkalinity | Accelerator | Solids |
| PECP[10] | Shale stabilizer | Fluid loss | Rheological Control | — |
| NaCl | Shale stabilizer | — | — | — |

[1]Polydrill, A synthetic polymer manufactured by SKW Chemicals Inc. under trade name Polydrill, for instance
[2]Starch made by Milpark Inc. under the trade name "PERMALOSE", for instance.
[3]A biopolymer made by Kelco Oil Field Group, Inc., under the trade name "BIOZAN" for instance.
[4]Water-soluble carbohydrate polymer manufactured by Grain Processing Co. under the trade name "MOR-REX".
[5]Barite is $BaSO_4$, a drilling fluid weighting agent.
[6]Bentonite is clay or colloidal caly thickening agent.
[7]Clay/quartz solid dust manufactured by MilWhite Corp. under the trade name "REVDUST", for instance.
[8]Blast furnace slag manufactured by Blue Circle Cement Co. under the trade name "NEWCEM" is suitable.
[9]CaO
[10]Polycyclicpolyetherpolyol The material in the above Tables A and B labeled PECP is of special significance in connection with this invention. This refers to a polyhydric alcohol most preferably a polycyclicpolyetherpolyol. A general chemical composition formula representative of one class of these materials is as follows:

where $x \geq 1$ and $y \geq 0$.

A more complete description of these polycyclic-polyetherpolyols is found in the Hale and Cowan patent, U.S. Pat. No. 5,058,679 (Oct. 22, 1991), referred to hereinabove, the disclosure of which is incorporated herein by reference.

In the case of hydraulic materials, particularly the more preferred hydraulic material, blast furnace slag, the amount of hydraulic material present in the universal fluid is generally within the range of 1 to 100 lbs/bbl of final drilling fluid, preferably 10 to 80 lbs/bbl, most preferably 20 to 50 lbs/bbl. In the case of the organo-metals (ionomers) or phosphorus salts the amount of metal compound initially present in universal fluid can also vary widely. Generally, 1 to 500 lbs/bbl, preferably 50 to 300 lbs/bbl, most preferably 100 to 250 lbs/bbl of the metal compound are used.

The total amount of cementitious material in the cementitious slurry will typically range from about 20 lbs/bbl to about 600 lbs/bbl, preferably 100 lbs/bbl to 500 lbs/bbl, most preferably 150 lbs/bbl to 350 lbs/bbl. This can be adjusted to give the desired density as noted hereinabove.

Universal drilling fluids which utilize blast furnace slag can be subsequently activated to cause the drilling fluid to develop compressive strength with time.

Suitable activators include sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium sulfate, calcium nitrate, calcium nitrite, calcium hydroxide, sodium sulfate and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to "lbs/bbl" means pounds per barrel of final cementitious slurry.

A combination of sodium hydroxide and sodium carbonate is preferred. In addition, blast furnace slag can be added between the use of this material as a drilling fluid and its use as a cement. The additional slag can be the activator, especially if heat is imparted to the operation. Each component is an important ingredient for both the drilling fluid and the cement. The PECP is particularly significant in combination with slag since it acts as a retarder and thus provides significant drilling fluid functions in general and specific drilling functions relative to the slag component as well as significant cement functions. PECP also reduces the friction coefficient of muds on casing and filter cake, and pullout forces required to release stuck pipe are dramatically reduced with PECP in the drilling fluid. PECP acts as a rheological modifier because of its absorptive properties to clay and polymers.

The unique advantage of universal fluids is that wellbore stabilization, fluid-loss control, and cuttings transport can be realized essentially the same as with conventional drilling fluid systems. However, with the simple presence of activators in the subsequent cementitious slurry, the resulting mud-slag system will develop strength. Thus, for instance, (1) drilling fluid filter cake deposited while drilling over permeable zones can be converted into an effective sealant by diffusion of activators from the mud-slag column; and
(2), whole mud that has not been removed from washed-out sections of the hole during displacement will harden with time and, therefore, provide an effective sealant and lateral support to the casing.

In areas such as slim hole drilling, the ionomer universal fluid gives the process benefit of avoiding the removal of an incompatible drilling mud and the product benefit of being resistant to deflection when set.

In the case of the universal fluids, the amount of cementitious material can vary considerably and also can vary depending upon whether the cementitious component is a siliceous material, an organometal, or a polyphosphate.

Process and apparatus used to drill and cement are well known. One example can briefly illustrate typical practice as follows. A well is drilled using a hollow drill string having a drill bit with at least one orifice communicating between the inside of the hollow drill string and the outside and located at the lower end of the drill string, thus producing a wellbore. During this drilling, a drilling fluid is circulated down the inside of the drill string and out of the orifice at the lower end thereof. When the drilling is complete, the drill string is withdrawn from the wellbore. A first section of well casing, generally having a float shoe with an upper sealing surface, is inserted into the wellbore. Additional sections of casing are generally attached sequentially to the first section and the first section is inserted further into the wellbore. In accordance with one embodiment of this invention, additional drilling fluid, containing additives necessary to form a cementitious slurry, is pumped down the casing. This may be facilitated by inserting a bottom plug into the casing string, the bottom plug having a longitudinal passage and a rupturable diaphragm at the top, so that it is forced down the casing by the cementitious slurry. Thereafter, a top or second plug can be inserted into the casing string above the column of cementitious slurry, the diaphragm of the first plug ruptured, and the slurry forced up into an annulus between the outside of the casing and the inside of the borehole where, with time, it hardens.

In accordance with another embodiment of this invention, the use of these conventional plugs for separating the cementitious slurry from the drilling fluid is generally not necessary. In this embodiment the drill string is simply removed, a casing inserted, and the cementitious slurry circulated into the borehole and up the annulus. This can abe done by direct fluid contact between the displacement fluid and the cementitious slurry thus eliminating the need for either a landing collar o wiper plug.

In yet another related embodiment of this invention, universal fluid is utilized in a drilling operation and thereafter additional cementitious material and/or additives, or the second component of a two-component system, is gradually added so as to gradually transition the circulating material from a drilling fluid to a cementitious slurry.

Filter Cake Setting

In yet another embodiment of this invention the drilling process is carried as described hereinabove with a universal fluid to produce a borehole through a plurality of strata thus laying down a filter cake. Prior to the cementing operation the activator or reactive second component is passed into contact with the filter cake, for instance by circulating the activator or reactive second component down the drill string and up the annulus between the drill string and the filter cake. This can be accomplished by circulating a separate fluid containing the activator or reactive second component or by adding an activator or reactive second component to the drilling fluid. Alternatively, the drill string is removed and the casing inserted and the activator or reactive second component circulated down the casing and up the annulus. As used herein 'down' as it relates to a drill string or casing, means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drilling fluid is then diluted, the drill string removed, and the cementing carried out as described hereinabove.

Conventional spacers may be used in the above described sequence. Also, any left over fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate when the universal fluid contains slag, or a polymer with a functional group such as a carboxy as described hereinabove wherein the universal fluid contains a metal compound proton acceptor, or the phosphoric (or polyphosphoric) or phosphonic acid component of a phosphate or phosphonate when the universal fluid contains a metal compound proton acceptor.

In another embodiment of this invention, the drilling is done using a drilling fluid containing a metal compound to lay down a filter cake which is preferably set by circulating a polymer as described to produce an ionomer or by circulating a phosphorus acid to produce a phosphate salt. Thereafter, the cementing is done with a cementitious slurry comprising blast furnace slag and an accelerator. Also, the use of blast furnace slag as described above for the metal compound source of an ionomer or phosphate salt can be used in this embodiment as well. Thus, ionomers or phosphorus salts can be formed as filter cake followed by cementing with blast furnace slag.

Puddling

Another area where the cementitious slurries of this invention find special applicability is in what is known as puddling. In accordance with this embodiment of the invention, the cementitious slurry is placed in the wellbore prior to inserting the casing into the wellbore. Placing the cementitious slurry into the wellbore prior to inserting the casing eliminates difficulty in displacing drilling fluids with cementitious slurry in portions of the borehole where the casing is poorly centralized. When the casing is poorly centralized, it is difficult to get the cement slurry in the narrow portion of the annulus. This results in a vertical channel that allows communication up the wellbore after the cement sets by placing the cement slurry into the wellbore prior to inserting the casing; these vertical channels will therefore be avoided even if the casing is poorly centralized. The use of blast furnace slag-based cement slurry facilitates the use of this procedure because setting of the blast furnace slag-based slurries can be retarded so that the casing can be inserted into the slurry and yet still form a strong cement within a reasonable time.

Surfactants, alcohols, or blends thereof may be used in the drilling fluids of this invention to improve bonding.

Bonding Surfactants

The surfactants may be anionic, amphoteric, cationic, nonionic or blends thereof, e.g., nonionics with anionic or cationic surfactants.

The following surfactants, classes of surfactants, and mixtures of surfactants are particularly useful in the present invention:

1. Alkanol amides (nonionic):

where R=a carbon chain (alkyl group) of 8–20 carbons (usually 10–18); $H_1$ and/or $H_2$ may be replaced by an alkanol such as ethanol or isopropanol. One or both of the H's may be replaced. Examples: lauric monoisopropanol amide, lauric diethanol amide, coconut diethanol amide. ALKAMIDE 2106® by Alkaril Chemicals, Ltd. is a coconut diethanol amide suitable for this application.

2. Ethoxylated alkyl aryl sulfonate: Examples: nonyl phenol sulfonate with 8 moles ethylene oxide, and N-decyl benzene sulfonate with 6 moles ethylene oxide.

3. Amine oxides (nonionic):

where R=alkyl carbon chains from 1 to 20 carbons, usually one chain is 10 to 18 carbons. Alkyl groups can have hydroxyl or amido functional groups in their chain. Examples: bis(2-hydroxyethyl) coco amine oxide, bis(2-hydroxyethyl) laurel amine oxide, laurel dimethyl amine oxide, coco amidopropyl dimethyl amine oxide, cetyl dimethyl amine oxide, myristyl dimethyl amine oxide.

4. Betaines and Betaine Derivatives where $R_1$=alkyl chain length between 3 and 20 carbons, $R_2$=alkyl chain length between 1 and 4 carbons. Anide functional groups may be incorporated into the $R_1$ alkyl chain. Examples: coco amido propyl betaine ($R_2$=propyl group 3 carbons), laurel betaine ($R_1$=laurel group of 12 carbons, no $R_2$), coco betaine ($R_1$=coco group of 12-14 carbons, no $R_2$), oleyl betaine ($R_1$- oleyl group of 18 carbons, no $R_2$), myristic betaine ($R_1$=myristyl group of 14 carbons, no $R_2$), oleamido propyl isostearamido propyl betaine, laurel sulfobetaine.

5. Ethoxylated Alcohols (nonionic): Ethoxylated simple alcohols with linear or branched chains having between 8 and 20 carbons with 3 to 20 mole of ethylene oxide groups; 6-14 moles of ethylene oxide are typical. Examples: $C_9-C_{11}$ linear alcohol with 8 moles ethylene oxide, $C_{14}-C_{15}$ linear alcohol with 13 moles ethylene oxide, $C_{12}-C_{15}$ linear alcohol with 9 moles ethylene oxide.

6. Sulfates and Sulfonates of Ethoxylated Alcohols (anionic): The same ranges apply as in No. 5 supra except ethylene oxide moles may vary between 2 and 14. Examples: $C_{12}-C_{13}$ linear alcohol sulfate or sulfonate with 3 moles ethylene oxide, $C_{12}-C_{15}$ linear alcohol sulfate or sulfonate with 3 moles ethylene oxide.

7. Ethoxylated Alkyl Phenols (nonionic): Alkyl chains of 8 to 20 carbons, usually between 4 and 14 carbons and more preferred to be 8 or 9 carbons, with 4-20 moles of ethylene oxide, usually between 7 and 20 moles and more preferred to 8-12 moles. Examples: Nonylphenol with 9 moles ethylene oxide, octylphenol with 8 moles ethylene oxide.

8. Sulfates or Sulfonates of Ethoxylated Alkyl Phenols (and their salts) (anionic) Examples: Nonyl phenol sulfate or sulfonate with 9 moles ethylene oxide; octyl phenol sulfate or sulfonate with 8 moles ethylene oxide.

9. Fluorocrabon-based Surfactants (nonionic, amphoteric, anionic): These must be water.soluble forms. Fluorocarbon esters such as 3M Company's FC-740 are oil soluble and not appropriate for this use. 3M Company's FC-100, FC-129, FC-170C are commercially available examples of fluorocarbon-based surfactants used in the invention. Examples: Fluoro-octyl sulfonate or sulfate, perfluorated quaternary ammonium oxide, and fluorinated $C_9-C_{11}$ alcohols with 7 moles ethylene oxide.

10. Phosphate Derivatives of Ethoxylated Alcohols: Examples: $C_{14}-C_{16}$ linear alcohols phosphate with 8 moles ethylene oxide; phosphated nonylphenol with 10 moles ethylene oxide.

11. Quaternary Ammonium Chloride (cationic): Dimethyl dicoco ammonium chloride, cetyl dimethyl benzyl ammonium chloride, cetyl dimethyl ammonium chloride.

12. Sulfates or Sulfonates of Alcohols (and their salts)(Anionic): Sulfated simple alcohols with carbon chains of 8-20, usually between 10 and 16 and most common 10-12. Examples: Sodium lauryl sulfate or sulfonate, potassium lauryl sulfate or sulfonate, magnesium lauryl sulfate or sulfonate, sodium n-decyl sulfate or sulfonate, triethanol amine laurel sulfate or sulfonate, sodium 2-ethylhexyl sulfate or sulfonate.

13. Condensation Products of Ethylene Oxide and Propylene Glycol (nonionic): Examples: Propoxylated $C_9-C_{14}$ alcohols with 6 moles ethylene oxide.

The surfactants or mixtures of surfactants should be soluble in the cementitious slurry and not precipitate or otherwise degrade under the action of the ions in the cementitious slurry (e.g., resistant to calcium and other electrolytes) and the temperature and pressure conditions occurring during the placement and curing of the cement.

Especially preferred are nonylphenol ethoxylates, coco amido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}-C_{15}$ linear alcohol ethoxylate sulfate, $C_9-C_{11}$ linear alcohol ethoxylate sulfates, sodium lauryl sulfate, and ethoxy alcohol sulfates.

The concentration of surfactant in the water phase used to prepare the slurry will generally be from about 0.1 to about 5% by weight, and more preferably from about 0.2 to about 3% by weight; excellent results have been obtained with concentrations between about 1.17 and about 2.33% by volume.

Alcohols

The invention is very effective for solidification of drilling fluids containing polyhydric alcohols. The following alcohols may be used alone or in blends with the preceding surfactants. The polyalcohol ingredients of drilling fluids containing polyalcohols are preferably acyclic polyols having at least two carbon atoms and 2 hydroxyl groups but no more than 18 carbon atoms and 13 hydroxyl groups. Preferably, the polyols of the invention have at least 2 carbon atoms and 2 hydroxyl groups, but no more than 9 carbon atoms and 7 hydroxyl groups.

Nonlimiting examples of such polyols include (carbons chains may be straight or branched), ethylene glycol, diethylene glycol, 1,2 -propanediol, 1,3-propanediol (propylene glycol), neopentyl glycol, pentaerythritol, 1,6-hexanediol, glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, polyethylene glycols, polypropylene glycols, ethylenepropylene glycol, polyethylenepropylene glycols, ethylene-propylene glycol copolymers and ethylenebutylene glycol copolymers, 1,5,6,9-decanetetrol, 1,1,4,4-cyclohexanetetramethanol, 1,2,4,5-cyclohexanetetramethanol, 1,4-cyclohexanedimethanol, 1,3-cyclopentanedimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl 1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3.-cyclopropanedimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1-hydroxycyclobutanemethanol, 3-methyl-2,2-butanediol, 1,2-pentanediol, 1,3-pentanediol, 1,4-pentanediol, 2,3-pentanediol, 2,4-pentanediol, 1,2,3-pentanetriol, 1,2,4-pentanetriol, 2,3,4-pentanetriol, 1,1-cyclopentanediol, 1,2-cyclopentanediol, 1,3-cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1-cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, 1,2,3,5-cyclohexanetetrol, sorbitol, mannitol.

More preferred alcohols are cyclicetherpolyols having at least 6 carbon atoms, at least 2 hydroxyl groups, and at least 2 ether linkages. Even more preferred are cyclicetherpolyols having at least 15 carbon atoms, 5 ether linkages, and at least 2 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages. Molecular structures with significantly larger molecular weights than the above minimums have been found to be advantageous. Among the cyclicetherpolyols, monocyclic. dietherdiols are preferred and polycyclicpolyetherpolyols (referred to hereinabove as PECP) are most preferred. "Poly" is used to mean two or more.

The alcohols or mixtures of alcohols useful in this invention should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in the drilling fluid (e.g., resistant to calcium and electrolytes) and the temperature and pressure conditions occurring during drilling. The alcohols may also be soluble at the ambient temperature and pressure conditions on the surface during the preparation of the drilling fluid of this invention. Some of the higher molecular weight alcohols may be very viscous liquids, or solids or have low solubility at the temperature conditions at the surface under which the drilling fluid is prepared. In these cases, the alcohols may be diluted with a suitable solvent which is soluble in the drilling fluid at the temperature conditions of drilling fluid preparation at the surface. Such suitable solvents may act to both lower viscosity and to increase solubility of the higher molecular weight alcohol for addition to the drilling fluid on the surface. Such solvents may be polyols of lower molecular weight, other alcohols such as methanol, ethanol, propanol, or isopropanol, water or mixtures of solvents and water.

The concentration of alcohol in the water phase when used in the preparation of the drilling fluid of this invention will generally be at least about 2% by weight and preferably from about 2 to about 30% by weight based on the water phase and more preferable from about 5 to about 15% by weight; excellent results have been obtained with concentrations between about 10 and about 20% by weight. Preferably at least about 1% w of the alcohol is cyclicetherpolyol or acyclic polyol, based on the total weight of the alcohol.

EXAMPLE 1

Effect of Dilution of a 13.6 lb/gal mud on the Development of Compressive Strength of a blast furnace slag cement slurry.

Mud 13.6 lb/gal PHPA/Starch Mud of the following composition:
NaCl (140,000 mg/l)
8–10 lb/bbl bentonite
4–6 lb/bbl "BIOLOSE[1]"
0.5–1 lb/bbl "NEWDRIL[2]"
1–1.25 lb/bbl "MILPAC[3]"
30–70 lb/bbl drill solids
1–250 lb/bbl barite
Cement Slurry Formulation
Md+4 lb/bbl Caustic soda+14 lb/bbl Soda ash+4 lb/bbl "SPERCENE CF[4]"+250 lb/bbl "NEWCEM[5]"
Test Temperature—165° F.

[1] Carboxymethyl starch sold under the trade name "BIOLOSE" by Milpark Drilling Fluids.
[2] Partially hydrolyzed polyacrylamide (PHPA) sold under the trade name "NEWDRIL" by Milpark Drilling Fluids.
[3] Polyionic cellulose (CMC) sold under the trade name "MILPAC" by Milpark Drilling Fluids.
[4] Chromium lignosulfonare thinner sold under the trade name "SPERCENE CF" by M-I Drilling Fluids.
[5] Blast furnace slag sold under the trade name "NEWCEM" by Blue Circle Cement Co.

| Initial Mud Volume (bbl) | Diluent, Seawater Volume (bbl) | Resulting Mud Volume (bbl) | Resulting Mud Density (lb/gal) | S-Mix Slurry Density (lb/gal) | Hardened S-Mix Compress Strength (psi) |
|---|---|---|---|---|---|
| 1.0 | 0 | 1.0 | 13.6 | 15.7 | 1,640 |
| 0.826 | 0.174 | 1.0 | 12.5 | 14.9 | 1,940 |
| 0.724 | 0.276 | 1.0 | 12.0 | 14.5 | 1,960 |

As can be seen, the control run having 0 diluent had a cement slurry density of 15.7 lb/gal and a compression strength of 1,640 psi. Remarkably, the cements made in accordance with the invention at lower slurry densities (where poorer strength would be expected) had higher compressive strength values.

EXAMPLE 2

| Mud Formulation and Solidification Results for: Seawater/Gyp/Lignosulfonate Mud | | | |
|---|---|---|---|
| Solidification Additives | Base Mud | No Dilution Method | Dilution Method |
| Initial Density, lb/gal | 15.9 | 15.9 | 14.3 |
| Blast Furnace Slag, lb/bbl | — | 200 | 200 |
| NaOH, lb/bbl | | 5 | 5 |
| Na$_2$CO$_3$m lb/bbl | | 5 | 5 |
| Final Density, lb/gal | — | 17.4 | 16.3 |
| Thickening Time (hrs:mins) at 160° F. | | 4:19 | 3:21 |
| Fluid Loss @ 160° F., mls (Filter Medium: 325 mesh screen Differential Pressure: 1000 psi) | — | 24 | 20 |
| Free Water at 160° F. | 0 | 0 | 0 |
| Settling at 160° F. | none | none | none |
| Compressive Strength @ 160° F. after: | | | |
| 12 hours | — | — | 1180 |
| 24 hours | — | — | 2640 |
| Compressive Strength @ 210° F. after: | | | |
| 12 hours | — | 1980 | 1250 |
| 24 hours | — | 2700 | 2870 |

EXAMPLE 3

| Mud Formulation and Solidification Results for Seawater/Polymer/Polyalcohol Mud | |
| --- | --- |
| Component | Concentration |
| Seawater, bbl | 0.72 |
| Polyglycerol, bbl | 0.03 |
| Synthetic Polymer, lb/bbl | 4 |
| Modified Starch, lb/bbl | 2 |
| Biopolymer, lb/bbl | 0.75 |
| Thermal Stabilizer, lb/bbl | 0.5 |
| Barite, lb/bbl | 279.9 |
| Density, lb/gal | 14 |

| Solidification Additives | Base Mud | No Dilution Method | Dilution Method |
| --- | --- | --- | --- |
| Initial Density, lb/gal | 14 | 14 | 12.5 |
| Blast Furnace Slag, lb/bbl | — | 250 | 250 |
| NaOH, lb/bbl | | 5 | 5 |
| $Na_2CO_3$m lb/bbl | | 5 | 5 |
| Lignosulfonate thinner, lb/bbl | | 5 | 5 |
| Final Density, lb/gal | 14 | 16 | 14.8 |
| Thickening Time (hours:minutes) at 165° F. | — | 3:18 | 3:03 |
| Plastic Viscosity at 80° F., cp | 28 | 97 | 47 |
| Yield Point at 80° F., lb/100 ft$^2$ | 16 | 61 | 31 |
| Gel Strengths at 80° F., lb/100 ft$^2$ | | | |
| 10 second | 4 | 40 | 13 |
| 10 minute | 7 | 125 | 50 |
| Plastic Viscosity at 165° F., cp | 19 | 70 | 35 |
| Yield Point at 165° F., lb/100 ft$^2$ | 11 | 65 | 25 |
| Gel Strengths at 165° F., lb/100 ft$^2$ | | | |
| 10 second | 4 | 35 | 20 |
| 10 minute | 4 | 48 | 25 |
| Fluid Loss at 300° F., ml (Filter Medium: Paper Differential Pressure: 500 psi) | 26 | — | — |
| Fluid Loss at 165° F., mls (Filter Medium: 325 mesh screen Differential Pressure: 1000 psi) | — | 257 | 398 |
| Free Water at 165° F. | 0 | 0 | 0 |
| Settling at 165° F. | none | none | none |
| Compressive Strength @ 210° F. after: | | | |
| 12 hours | — | 1500 | 1225 |
| 24 hours | — | 1710 | 1421 |
| Hydration Volume Reduction, % | — | 1.05 | 1.05 |

These results show quicker thickening times in accordance with the invention.

While this invention has been described in detail for the purpose of illustration, it is not to be construed as limited thereby, but is intended to cover all the changes and modifications within the spirit and scope thereof.

What is claimed is:

1. A method for drilling and cementing a well, comprising:
   combining constituents comprising water, clay and blast furnace slag having a particle size within the range of 2,000 to 15,000 cm$^2$/g to produce a drilling fluid, said slag being present in an amount within the range of 20 to 50 lbs/bbl of said drilling fluid;
   thereafter utilizing said drilling fluid in a well drilling operation to form a borehole, thus producing a used drilling fluid;
   thereafter passing at least a portion of said used drilling fluid as a flowing stream to a mixing zone;
   introducing additional water to said flowing stream;
   introducing additional blast furnace slag and an activator to said mixing zone and mixing to produce a cementitious slurry, said additional blast furnace slag being used in an amount sufficient to give a final density to the said cementitious slurry within the range of 15 percent less to 50 percent more than the original density of said drilling fluid; and
   passing said cementitious slurry down said borehole and up into an annulus formed by said borehole and a pipe.

2. A method according to claim 1 wherein said drilling fluid comprises, in addition, a polycyclicpolyetherpolyol.

3. A method according to claim 1 wherein said well drilling is an extended reach well drilling operation.

4. A method according to claim 1 wherein said water of said drilling fluid contains dissolved salts.

5. A method according to claim 4 wherein said water of said drilling fluid is seawater, said activator is a mixture of sodium hydroxide and sodium carbonate and wherein 5 to 20 wt % of said slag has an ultrafine particle size.

6. A method according to claim 1 wherein said drilling fluid contains, in addition, a mixed metal hydroxide.

7. A method according to claim 6 wherein said mixed metal hydroxide is MgAl(OH)$_{4.7}$Cl$_{0.3}$ and wherein a lignosulfonate thinner is added to said used drilling fluid before said additional blast furnace slag is added and wherein said activator is a mixture of sodium hydroxide and sodium carbonate.

8. A method for drilling and cementing a well, comprising:
   combining constituents comprising water, clay and a metal oxide proton acceptor component to produce a drilling fluid;
   thereafter utilizing said drilling fluid in a well drilling operation to form a borehole, thus producing a used drilling fluid;
   thereafter passing at least a portion of said used drilling fluid as a flowing stream to mixing zone;
   introducing additional water to said flowing stream;
   introducing additional metal oxide component to said mixing zone and introducing 10 to 80 wt % based on the weight of said metal oxide of a carboxylic polymer to said mixing zone and mixing to produce a cementitious slurry, said additional metal oxide and polymer being used in an amount sufficient to give a final density to said cementitious slurry within the range of 15 percent less 50 percent more than the original density of said drilling fluid; and
   passing said cementitious slurry down said borehole and up into an annulus formed by said borehole and a pipe.

9. A method according to claim 8 wherein said metal oxide is magnesium oxide and said carboxylic polymer is poly(acrylic acid).

10. A method according to claim 8 wherein said drilling fluid comprises, in addition, a polycyclicpolyetherpolyol.

11. A method according to claim 8 wherein said well is an extended reach well.

12. A method according to claim 8 wherein said drilling fluid contains no weighting agents.

13. A method for drilling and cementing a well, comprising:
   combining constituents comprising water, clay and a base metal oxide component selected from CaO, MgO and ZnO to produce a drilling fluid;
   thereafter utilizing said drilling fluid in a well drilling operation to form a borehole, thus producing a used drilling fluid;
   thereafter passing at least a portion of said used drilling fluid as a flowing stream to a mixing zone;
   introducing additional water to said flowing stream;
   introducing additional metal oxide component to said mixing zone and introducing a component selected from phosphoric acid and polyphosphoric acid to said mixing zone and mixing to produce a cementitious slurry, said additional metal oxide and phosphoric or polyphosphoric acid being used in an amount sufficient to give a final density to said cementitious slurry within the range of 15 percent less to 50 percent more than the original density of said drilling fluid; and
   passing said cementitious slurry down said borehole and up into an annulus formed by said borehole and a casing.

14. A method according to claim 13 wherein said phosphoric or polyphosphoric acid is metaphosphoric acid.

15. A method according to claim 13 wherein said drilling fluid comprises, in addition, a polycyclicpolyetherpolyol.

16. A method according to claim 13 wherein said well is an extended reach well.

17. A method according to claim 13 wherein said water of said drilling fluid contains dissolved salts.

18. A method according to claim 17 wherein said water is seawater.

19. A method according to claim 13 wherein said drilling fluid contains, in addition, a mixed metal hydroxide.

20. A method according to claim 19 wherein said mixed metal hydroxide is $MgAl(OH)_{4.7}Cl_{0.3}$ and wherein a lignosulfonate thinner is added to said used drilling fluid prior to said introducing said additional metal oxide component.

21. A method for drilling and cementing a well, comprising:
   combining constituents comprising water, clay and a first portion of a cementitious material to produce a drilling fluid;
   thereafter utilizing said drilling fluid in a well drilling operation to form a borehole with a drill string, thus producing a used drilling fluid;
   removing said drill string and inserting a casing;
   introducing additional water to said used drilling fluid;
   passing said used drilling fluid down said borehole and up into an annulus formed by said borehole and said casing; and
   gradually adding additional cementitious material to gradually transition from a drilling fluid to a cementitious slurry.

22. A method according to claim 21 wherein said additional water is added to a flowing stream of said used drilling fluid.

23. A method for drilling and cementing a well, comprising:
   a) combining constituents comprising water, clay and a cementitious material to produce a drilling fluid;
   b) utilizing said drilling fluid in a well drilling operation to form a borehole with a drill string having a hollow pipe, thus laying down a filter cake on walls of said borehole;
   c) passing an activator-containing fluid down said hollow pipe and up into contact with said filter cake;
   d) displacing said activator-containing fluid with a drilling fluid and continuing said drilling operation thus producing a used drilling fluid;
   e) removing said drill string, inserting a casing and diluting at least a portion of said used drilling fluid to produce a diluted used drilling fluid; and
   f) introducing an activator system into said diluted used drilling fluid and passing said drilling fluid containing said activator down said borehole and up into an annulus formed by said borehole and a casing.

24. A method according to claim 23 wherein said cementitious material is blast furnace slag and said activator system of f) comprises additional blast furnace slag and a member selected from the group consisting of (1) a mixture of sodium or potassium hydroxide and sodium or potassium carbonate, (2) alkali metal hydroxides, (3) alkali metal salts, (4) transition metal hydroxides and (5) transition metal salts.

25. A method according to claim 23 wherein said cementitious material is blast furnace slag and said activator system of f) comprises additional blast furnace slag and a mixture of sodium hydroxide and sodium carbonate.

26. A method according to claim 23 wherein said cementitious material is a metal oxide proton acceptor and said activator system of f) is a member selected from the group consisting of phosphoric acid, polyphosphoric acid and a polymer of the formula wherein A is or a mixture of and wherein R is H or a 1–10 carbon atom alkyl radical.

27. A method for drilling and cementing a well, comprising:
utilizing a drilling fluid comprising water and a cementitious component in a well drilling operation to form a borehole, thus producing a used drilling fluid;
thereafter diluting said used drilling fluid with additional water to reduce a diluted drilling fluid;
combining said diluted drilling fluid with blast furnace slag and an activator to produce a cementitious slurry; and
passing said cementitious slurry down said borehole and up into an annulus formed by said borehole and a casing by means of direct fluid contact with a displacement fluid.

28. A method according to claim 24 wherein said cementitious material of said drilling fluid and said additonal drilling fluid is blast furnace slag and said activator is a mixture of sodium hydroxide and sodium carbonate.

29. A method comprising:
a) combining components comprising water and a metal compound which is a proton acceptor to produce a drilling fluid;
b) utilizing said drilling fluid in a well drilling operation to form a borehole with a drill string having a hollow pipe, thus laying down a filter cake on walls of said borehole and producing a used drilling fluid;
c) passing a reactive second component down said hollow pipe and up into contact with said filter cake;
d) removing said drill string, inserting a pipe, and diluting at least a portion of said used drilling fluid to produce a diluted drilling fluid;
e) combining blast furnace slag and an activator with said diluted drilling fluid to produce a cementitious slurry; and
f) passing said cementitious slurry down said pipe and up into an annulus surrounding said pipe.

30. A method for drilling and cementing a well, comprising:
combining constituents comprising water, clay and blast furnace slag having a particle size within the range of 2,000 to 15,000 $cm^2/g$ to produce a drilling fluid, said slag being present in an amount within the range of 20 to 50 lbs/bbl of said drilling fluid;
thereafter utilizing said drilling fluid in a well drilling operation to form a borehole, thus producing a used drilling fluid;
thereafter passing at least a portion of said used drilling fluid as a flowing stream to a mixing zone;
introducing additional water to said flowing stream;
introducing additional blast furnace slag to said mixing zone and mixing to produce a cementitious slurry, said additional blast furnace slag being used in an amount sufficient to give a final density to the said cementitious slurry within the range of 15 percent less to 50 percent more than the original density of said drilling fluid; and
passing said cementitious slurry down said borehole and into an annulus formed by said borehole and a pipe.

* * * * *